UNITED STATES PATENT OFFICE.

JOHN HARRIGAN, OF BOSTON, MASSACHUSETTS.

IMPROVEMENT IN MEDICAL COMPOUNDS TO CURE CANCER.

Specification forming part of Letters Patent No. 133,443, dated November 26, 1872.

*To all whom it may concern:*

Be it known that I, JOHN HARRIGAN, of Boston, in the county of Suffolk and State of Massachusetts, have invented a certain new and useful Preparation for Cancer-Cure, of which the following is a specification:

The Nature of the Invention.

The nature of my invention consists in the discovery of a composition obtained from the root of the black ash, (*fraxinus sambucifolia*,) that, when applied to a cancerous sore, will speedily cure the same; and the following is an exact description of the method of preparing and using this new remedy.

Method of Preparing.

I take the cleansed bark of the root of the black ash, (*fraxinus sambucifolia*,) and, having thoroughly dried the same, burn it in a furnace in which a free supply of oxygen is admitted, so that all of the organic elements may pass off in the form of vapor, carbonic-acid gas, &c. The residue is carefully collected, washed, and exposed to the action of boiling water for one and a half hour, after which it is carefully filtered. The filtrate which contains the more soluble elements is thrown away. The residue within the filter is carefully dried, and constitutes the composition I use.

Use.

This ashy powder, when used, may be mixed with just water enough to make a thick paste, and in this state is applied to the cancer, where it should remain undisturbed from two to four days, according to the necessities of the case. After it has remained a sufficient length of time it is to be removed and an ordinary meal-poultice placed in its stead, which should remain twelve hours. This, in most of cases, will effect a cure.

I claim as my invention—

The preparation above described, when applied for the purpose set forth.

JOHN HARRIGAN.

Witnesses:
   FRANK G. PARKER,
   D. A. MARTIN.